US010280309B2

(12) United States Patent
Gerard et al.

(10) Patent No.: US 10,280,309 B2
(45) Date of Patent: May 7, 2019

(54) SURFACE-REACTED PRECIPITATED CALCIUM CARBONATE, PROCESS TO MAKE SAME, AND USES THEREOF

(75) Inventors: Daniel E. Gerard, Basel (CH); Patrick A. C. Gane, Rothrist (CH); Joachim Schölkopf, Killwangen (CH); Hans-Joachim Weitzel, Suhr (CH)

(73) Assignee: Omya International AG, Oftringen (CH)

( * ) Notice: Subject to any disclaimer, the term of this patent is extended or adjusted under 35 U.S.C. 154(b) by 821 days.

(21) Appl. No.: 12/734,992

(22) PCT Filed: Dec. 2, 2008

(86) PCT No.: PCT/EP2008/066631
§ 371 (c)(1),
(2), (4) Date: Jul. 7, 2010

(87) PCT Pub. No.: WO2009/074492
PCT Pub. Date: Jun. 18, 2009

(65) Prior Publication Data
US 2010/0282127 A1    Nov. 11, 2010

Related U.S. Application Data

(60) Provisional application No. 61/008,208, filed on Dec. 19, 2007.

(30) Foreign Application Priority Data
Dec. 12, 2007    (EP) ..................................... 07123077

(51) Int. Cl.
*C09C 1/02*      (2006.01)
*D21H 17/69*     (2006.01)

(52) U.S. Cl.
CPC ............. *C09C 1/022* (2013.01); *D21H 17/69* (2013.01); *C01P 2004/61* (2013.01); *C01P 2004/62* (2013.01); *C01P 2006/12* (2013.01)

(58) Field of Classification Search
None
See application file for complete search history.

(56) References Cited

U.S. PATENT DOCUMENTS

| | | | | |
|---|---|---|---|---|
| 2,114,600 A * | 4/1938 | Larsson | ......................... | 423/162 |
| 2,313,844 A * | 3/1943 | Sullivan | ......................... | 423/430 |
| 3,520,813 A * | 7/1970 | Guthrie | .................. | C02F 5/125 134/3 |
| 3,661,610 A * | 5/1972 | Ferris | ........................ | C09C 1/42 106/462 |
| 4,244,933 A | 1/1981 | Shibazaki et al. | | |
| 4,367,207 A | 1/1983 | Vanderheiden | | |
| 5,015,669 A | 5/1991 | Aumann et al. | | |
| 5,043,017 A | 8/1991 | Passaretti | | |
| 5,376,343 A * | 12/1994 | Fouche | ................. | C01F 11/181 423/165 |
| 5,833,747 A | 11/1998 | Bleakley et al. | | |
| 5,939,036 A * | 8/1999 | Porter et al. | .................. | 423/432 |
| 6,143,065 A * | 11/2000 | Freeman | ................. | C01F 11/18 106/464 |
| 6,228,161 B1 * | 5/2001 | Drummond | .................... | 106/464 |
| 6,251,222 B1 * | 6/2001 | Silenius | ................. | D21H 17/69 162/100 |
| 6,251,356 B1 * | 6/2001 | Mathur | ................. | C01F 11/181 423/430 |
| 6,342,100 B1 | 1/2002 | Nover et al. | | |
| 6,500,400 B1 * | 12/2002 | Kinnen et al. | ................ | 423/432 |
| 6,666,953 B1 | 12/2003 | Gane et al. | | |
| 7,033,428 B2 * | 4/2006 | Drummond | .................... | 106/464 |
| 7,159,803 B1 * | 1/2007 | Huang | ............................. | 241/21 |
| 2002/0148582 A1 * | 10/2002 | Drummond | .................... | 162/158 |
| 2002/0164280 A1 * | 11/2002 | Kinnen et al. | ................ | 423/432 |
| 2003/0051841 A1 * | 3/2003 | Mathur | ................... | C01B 33/24 162/181.1 |
| 2004/0020410 A1 | 2/2004 | Gane et al. | | |
| 2004/0121093 A1 * | 6/2004 | Ogino et al. | ................. | 428/32.1 |
| 2004/0238455 A1 * | 12/2004 | Leino | ............................ | 210/743 |

(Continued)

FOREIGN PATENT DOCUMENTS

EP    0 406 662 A1    1/1991
FR    2 787 802       6/2000

(Continued)

OTHER PUBLICATIONS

Communication dated Jul. 18, 2008 from the European Patent Office, in connection with European Application No. 07123077.5.
International Search Report dated Jan. 28, 2009 for PCT Application No. PCT/EP2008/066631.
"Physical Constants of Inorganic Compounds," CRC Handbook of Chemistry and Physics, pp. 4-52 to 4-55.
Chang, "Solubility Product Constants," CRC Handbook of Chemistry and Physics, p. 8-39.
Ridgway et al. "Achieving Rapid Absorption and Extensive Uptake Capacity in Porous Structures by Decoupling Capillarity and Permeability: Nonoporous Modified Calcium Carbonate." Transport in Porous Media (2006) 63: 239-259.
Patent Owner's Reply to Notice of Opposition, dated Nov. 17, 2011.
EPO, Decision to Grant, in related European patent application No. 07123077.5, dated Aug. 12, 2010, 1 page.
INPI, Search Report and Office Action, in related Brazilian patent application No. PI0820919-7, dated Sep. 18, 2017, 7 pages.

(Continued)

*Primary Examiner* — Colleen P Dunn
*Assistant Examiner* — Ross J Christie
(74) *Attorney, Agent, or Firm* — Amster, Rothstein & Ebenstein LLP

(57) ABSTRACT

The present invention relates to a process for the preparation of a surface-reacted precipitated calcium carbonate (PCC) pigment having an insoluble, at least partially crystalline calcium salt on its surface. In the process of the present invention, a PCC containing pigment is contacted with $H_3O^+$ ions and a solubilized anion in an aqueous medium in the presence of excess solubilized calcium ions to form the surface-reacted PCC having an insoluble, at least partially crystalline calcium salt of the anion formed on its surface.

50 Claims, No Drawings

(56) References Cited

U.S. PATENT DOCUMENTS

| | | | |
|---|---|---|---|
| 2004/0242748 A1* | 12/2004 | Takahashi | ............... C09C 1/021 106/464 |
| 2006/0003117 A1* | 1/2006 | Superka | ............... B41M 5/5218 106/464 |
| 2006/0162884 A1 | 7/2006 | Gane et al. | |
| 2008/0022901 A1 | 1/2008 | Buri et al. | |

FOREIGN PATENT DOCUMENTS

| | | | |
|---|---|---|---|
| WO | WO 97/32934 | 9/1997 | |
| WO | WO 9820079 A1 * | 5/1998 | ............. C09C 1/024 |
| WO | WO 98/41475 | 9/1998 | |
| WO | 2000039222 A1 | 7/2000 | |
| WO | WO 2004/083316 A1 | 9/2004 | |
| WO | 2005102931 A2 | 11/2005 | |
| WO | 2005123593 A1 | 12/2005 | |
| WO | WO 2005/121257 A2 | 12/2005 | |

OTHER PUBLICATIONS

CIPO, Office Action, in related Canadian patent application No. 2708091, dated May 26, 2014, 3 pages.
CIPO, Office Action, in related Canadian patent application No. 2708091, dated Apr. 7, 2015, 4 pages.
CIPO, Office Action, in related Canadian patent application No. 2708091, dated Nov. 13, 2015, 3 pages.
CIPO, Office Action, in related Canadian patent application No. 2708091, dated May 13, 2016, 3 pages.
CIPO, Notice of Allowance, in related Canadian patent application No. 2708091, dated Oct. 19, 2016, 1 page.
SIPOPRC, Translation of the Office Action, in related Chinese patent application No. 200880125350.3, dated Oct. 12, 2012, 5 pages.
EPO, Office Action, in related European patent application No. 08860503.5, dated Jan. 11, 2011, 5 pages.
EPO, Office Action, in related European patent application No. 08860503.5, dated Jan. 13, 2013, 5 pages.
EPO, Decision to Grant, in related European patent application No. 08860503.5, dated Jan. 26, 2017, 2 pages.
GIPO, First Examination Report, in related Indian patent application No. 1167/MUMNP/2010, dated Mar. 25, 2014, 7 pages.
GIPO, Hearing Notice, in related Indian patent application No. 1167/MUMNP/2010, dated Nov. 27, 2015, 1 page.
GIPO, Reply of Second Examination Report and Hearing, in related Indian patent application No. 1167/MUMNP/2010, dated Feb. 10, 2016, 16 pages.
GIPO, Grant of Patent, in related Indian patent application No. 1167/MUMNP/2010, dated Feb. 22, 2016, 2 pages.
JPO, Translation of the Notice of Reasons for Rejection, in related Japanese patent application No. 2010-537383, dated Jun. 24, 2013, 4 pages.
KIPO, Translation of the Office Action, in related Korean patent application No. 10-2010-7015253, dated Aug. 4, 2014, 7 pages.
KIPO, Translation of the Notice of Allowance, in related Korean patent application No. 10-2010-7015253, dated May 28, 2015, 2 pages.
KIPO, Translation of the Allowed Claims, in related Korean patent application No. 10-2010-7015253, dated May 28, 2015, 6 pages.
ROSPATENT, Translation of the Decision to Grant, in related Russian patent application No. 2010128668/05, dated Jul. 18, 2012, 10 pages.
TIPO, Translations of the Examination Report and the Search Report, in related Taiwanese patent application No. 097147931, dated Sep. 12, 2013, 7 pages.
TIPO, Notice of Allowance and Translation, in related Taiwanese patent application No. 097147931, dated Jun. 9, 2014, 3 pages.

* cited by examiner

SURFACE-REACTED PRECIPITATED CALCIUM CARBONATE, PROCESS TO MAKE SAME, AND USES THEREOF

This is a U.S. national phase of PCT Application No. PCT/EP2008/066631, filed Dec 2, 2008, which claims the benefit of European Application No. 07123077.5, filed Dec 12, 2007 and U.S. Provisional Application No. 61/008,208, filed Dec 19, 2007.

The present invention concerns the technical field of high BET specific surface area mineral fillers based on precipitated calcium carbonate (PCC), which is also known as synthetic calcium carbonate.

Such fillers find applications in a number of domains, including in paper, namely as a filler or a coating pigment, in tissue paper, in paints, in plastics, in water treatment, and notably as a means of removing pitch and endocrine disrupting compounds (EDC).

The calcium carbonate mineral is generally distinguished according to two classes: ground (or natural) calcium carbonate (GCC), and precipitated calcium carbonate (PCC).

GCC is understood to be a naturally occurring form of calcium carbonate, mined from sedimentary rocks such as limestone or chalk, or from metamorphic marble rocks. GCC is almost exclusively of the calcitic polymorph, which is said to be trigonal-rhombohedral and represents the most stable of the calcium carbonate polymorphs.

By contrast, calcium carbonate polymorphs of the PCC type often include, in addition to calcites, less stable polymorphs of the aragonitic-type, which has an orthorhombic, acicular crystal shape, and hexagonal vateritic-type, which has an even lower stability than aragonite. The different PCC forms may be identified according to their characteristic x-ray powder diffraction (XRD) peaks.

PCC synthesis most commonly occurs by a synthetic precipitation reaction that includes a step of contacting carbon dioxide with a solution of calcium hydroxide, the latter being most often provided on forming an aqueous suspension of calcium oxide, also known as burnt lime, and the suspension of which is commonly known as milk of lime. Depending on the reaction conditions, this PCC can appear in various forms, including both stable and unstable polymorphs. Indeed, PCC often represents a thermodynamically unstable calcium carbonate material.

When referred to in the context of the present invention, PCC shall be understood to mean synthetic calcium carbonate products obtained by carbonation of a slurry of calcium hydroxide, commonly referred to in the art as a slurry of lime or milk of lime when derived from finely divided calcium oxide particles in water.

Indeed, it is a significant advantage of the present invention, as will be understood hereafter, that it implements a PCC obtained by such a common process. It will, of course, be understood by the skilled man that further additives, precipitation conditions or steps prior to or following this precipitation may be implemented when forming such PCC by carbonation of a lime slurry; however, he will immediately recognise the advantage of being able to implement the process of the present invention on any such PCC, including a very basic PCC obtained by simply carbonating a pure lime slurry.

GCC and PCC forms of calcium carbonate are, on occasion and on an unpredictable basis, observed to present different chemical properties, and frequently it is not possible to use GCC in the same applications as PCC and vice versa.

For example, it was found that the technology described in EP 1 149 136 relating to an:

"aqueous suspension of one or more pigments, fillers or minerals, which may contain a dispersant polymer to stabilise the rheology of the suspension, characterised by the fact that:

a) it contains a natural carbonate and the reaction product or products of the said carbonate with gaseous $CO_2$ and the reaction product or products of the said carbonate with one or more medium-strong to strong $H_3O^+$ ion-providers, and b) it has a pH greater than 7.5 measured at 20° "C.", is not transferable to PCC.

It has been found that when implementing PCC in place of GCC (where GCC acts as the "natural carbonate") in the technology of EP 1 149 136 and notably when reproducing technology of EP 1 149 136 in the case where the $CO_2$ is generated by continuous addition of the $H_3O^+$-ion provider, the specific surface area of the resulting PCC-based product failed to develop sufficiently.

Indeed, the technology of EP 1 149 136 is of particular interest as it provides a means of structuring the surface and significantly increasing the specific surface area of the GCC starting material by controlled deposition of an at least partially crystalline calcium salt thereon, and such that the calcium source for this deposited material is the GCC mineral itself.

The skilled man, who is eager to obtain such a high surface area material, but wishes to have the option of using a PCC-based starting material, as this material may, for example as a function of availability and particular physical properties, present certain advantages over GCC, is therefore left looking for a solution to implement the above technology.

In the prior art, it is of note that while a number of documents focus on the introduction of particular additives during the PCC formation process, few documents provide any teaching relating to the use of a fully formed PCC as an adduct in a process to surface-react this PCC.

U.S. Pat. No. 4,367,207 describes a particular process to prepare PCC. It is stated that care is taken to neutralise any unreacted calcium hydroxide still present in the carbonated slurry, such as by addition of a sufficient amount of organic or inorganic polybasic acid, namely citric, maleic, malic, malonic, phthalic, tartaric, boric, phosphoric, sulfurous or sulfuric acid.

WO 2005/123593 relates to a process wherein citric acid is admixed with a calcium hydroxide slurry and the slurry carbonated to produce a slurry of PCC, which is thereafter dewatered to produce a high solids PCC composition. It is stated that, optionally, citric acid may be added in conjunction with or subsequent to the addition of a dispersant to the produced high solids PCC composition, though this option is neither further described nor exemplified. Additionally, it is indicated that phosphoric acid may be added to the PCC slurry at a given, limited concentration never exceeding 0.8% by weight on the weight of PCC, to maintain the surface area of this PCC.

WO 2005/102931 describes a process wherein a first amount of organophosphate is added to a calcium hydroxide slurry, prior to addition of aluminium sulphate and thereafter $CO_2$ to form a PCC. A second amount of organophosphate is then added to the PCC slurry, followed by screening and dewatering of this slurry to form a concentrated PCC composition. As above, it is indicated that a limited amount of phosphoric acid never exceeding 1.5% by weight on the weight of PCC, may be admixed with the PCC slurry to stabilise and maintain the PCC surface area.

EP 0 406 662 describes a process for manufacturing a synthetic carbonate in which a pre-mix is made of $CaCO_3$ in aragonite form with lime: to this slurry is added a "phosphoric acid derivative" such as phosphoric acid or its salts or various phosphates, and finally $CO_2$ is introduced in order to produce conventional carbonation. The purpose of this patent is specifically to obtain a PCC with a particular acicular crystalline form, of which the industrial manufacture was not previously possible. Phosphoric acid is used in EP 0 406 662 in order to produce specifically the aragonite form via an unidentified "phosphoric acid calcium" which provides new nucleation seeds for the required crystalline form.

It was found by the applicant that the addition of calcium ions via a base (lime) in the process of EP 0 406 662 does not lead to the desired surface-reacted PCC.

Indeed, when the Applicant attempted to implement a process wherein the solubilised calcium ion source was calcium hydroxide as described in EP 0 406 662, particularly at the high calcium hydroxide levels described therein, the Applicant found that a material was obtained wherein the calcium forming any at least partially crystalline material at the surface did not originate from the PCC starting material, but rather from the added calcium hydroxide.

U.S. Pat. No. 5,043,017 describes the acid-stabilisation of calcium carbonate, and in particular of PCC, by action of a calcium-chelating agent, such as calcium hexametaphosphate, and a conjugate associated base, which can be an alkaline metal salt of a weak acid (phosphoric, citric, boric, acetic, etc.). Indeed, the goal of U.S. Pat. No. 5,043,017 is entirely in opposition to the need of the present invention to maintain the acid-reactivity of the PCC in order to generate solubilised calcium ions, these ions being needed to form a surface area-generating crystal on the PCC surface.

U.S. Pat. No. 4,244,933 describes calcium carbonate particles comprising a core and projections thereon, prepared by a first step of spraying an aqueous suspension of calcium hydroxide into a reactor from its top in countercurrent relation to the carbon dioxide gas passed upwards through the reactor to convert part of the calcium hydroxide to calcium carbonate, followed by a second step of spraying the resulting mixture into another reactor from its top in countercurrent relation to the carbon dioxide gas passed upwards through the reactor to promote carbonation of the calcium hydroxide, and a third similar step to complete carbonation, wherein the first or second step implements phosphoric acid and water-soluble salts thereof. These water soluble salts are said to be sodium, potassium, zinc and the like salts of phosphoric acid.

Finally, whereas EP 1 769 035 discloses a dry mineral pigment characterised in that it contains a product formed in situ by the multiple reaction between a calcium carbonate and:
- the product or products of the reaction of the said carbonate with one or more moderately strong to strong $H_3O^+$ ion donators;
- the product or products of reaction of the said carbonate with gaseous $CO_2$ formed in situ and/or originating from an external supply;
- one or more compounds of formula R-X.

However, no further teaching is provided in this document to obtain a high specific surface area surface-reacted precipitated calcium carbonate.

In summary, the prior art:
- focuses largely on the optimisation of the adducts used during PCC formation, rather than on contacting already formed PCC with particular additives in order to increase the BET specific surface area of this PCC;
- discloses that when PCC is combined with an anion in the form of a soluble acid or acid salt, and which has an insoluble corresponding calcium salt, such as phosphoric acid, either no additional means are referenced to provide the needed solubilised calcium ions, and this anion only serves to maintain, and not to significantly develop, the BET specific surface area of the PCC;
- discloses that when PCC is combined with an anion in the form of a soluble acid or acid salt, and which has an insoluble corresponding calcium salt, such as phosphoric acid, and calcium ions are provided, these calcium ions are provided in a form which the Applicant has found do not lead to the desired surface-reacted PCC.

Entirely by surprise, the Applicant has found that control of particular parameters during such a process as defined hereafter, and notably control of the solubilised calcium ions available at one or more specific points in this process, is key to the success of forming a high specific surface area surface-reacted precipitated calcium carbonate.

Namely, the Applicant has developed a process for the preparation of a pigment comprising a surface-reacted precipitated calcium carbonate (PCC), the process comprising the following steps:
a) providing at least one precipitated calcium carbonate (PCC)-comprising pigment;
b) providing $H_3O^+$ ions;
c) providing at least one anion being capable of forming water-insoluble calcium salts, said anion being solubilised in an aqueous medium;
d) contacting said PCC-comprising pigment with said $H_3O^+$ ions and with said solubilised anions in an aqueous medium to form a slurry of surface-reacted PCC-comprising pigment, wherein said surface-reacted PCC comprises an insoluble, at least partially crystalline calcium salt of said anion formed on the surface of at least part of the PCC provided in step a);

characterised in that an excess of solubilised calcium ions is provided during Step d).

For the purpose of the present Application, insoluble materials are defined as those which, when mixed with deionised water and filtered at 20° C. to recover the liquid filtrate, provide less than or equal to 0.1 g of recovered solid material following evaporation at 95 to 100° C. of 100 g of said liquid filtrate. Soluble (or solubilised) materials are defined as materials leading to the recovery of greater than 0.1 g of recovered solid material following evaporation at 95 to 100° C. of 100 g of said liquid filtrate.

For the purpose of the present Application, said excess solubilised calcium ions shall correspond to an excess of solubilised calcium ions relative to the solubilised calcium ions naturally generated on dissolution of PCC by $H_3O^+$ ions, where said $H_3O^+$ ions are provided solely in the form of a counterion to the anion, i.e. via the addition of the anion in the form of an acid or non-calcium acid salt, and in absence of any further calcium ion or calcium ion generating source.

Said excess solubilised calcium ions provided during step d) are preferably provided via one or more of the following Routes:

Route IA: addition of a soluble neutral or acid calcium salt;
Route IIA: addition of an acid or a neutral or acid non-calcium salt which generates a soluble neutral or acid calcium salt in situ.

Said $H_3O^+$ ions may be provided via one or more of the following Routes:

Route IB: addition of acid or an acid salt of said anion;
Route IIB: addition of an acid or an acid salt which simultaneously serves to provide all or part of said excess solubilised calcium ions.

For the purpose of the present invention, an "acid" is defined as a Bronsted-Lowry acid, that is to say, it is an $H_3O^+$ ion-provider. An "acid salt" is defined as an $H_3O^+$ ion-provider that is partially neutralised by an electropositive element. A "salt" is defined as an electrically neutral ionic compound formed of anions and cations. A "partially crystalline salt" is defined as a salt that, on XRD analysis, presents an essentially discrete diffraction diagram.

For the purpose of the present invention, a surface-reacted PCC is a material comprising PCC and an insoluble, at least partially crystalline, calcium salt of said solubilised anion.

In a preferred embodiment, the insoluble calcium salt extends from the surface of at least part of the PCC.

The calcium ions forming said at least partially crystalline calcium salt of said anion originate largely from the starting PCC material.

Without wishing to be bound by any theory, the Applicant believes that in order to form a high specific surface area surface-reacted calcium carbonate, wherein the calcium ions forming the insoluble, at least partially crystalline, calcium salt of said anion are provided largely by the calcium carbonate starting material, it is necessary not only to liberate these calcium ions from this calcium carbonate, but to do so under conditions such that said calcium ions are maintained sufficiently mobile to preferentially precipitate, not on the calcium carbonate surface from which they evolve, but rather on any already formed calcium anion crystals extending from the calcium carbonate surface, such that said crystals grow outward from the carbonate surface and do not cover the undissolved carbonate before sufficient calcium ions are released therefrom to generate the needed crystal surface to achieve the desired specific surface area.

Without wishing to be bound by any theory, the Applicant believes that PCC synthesised via carbonation of a lime slurry contains unreacted calcium hydroxide entrapped in the PCC core that migrates to locations along the PCC surface. The Applicant theorises that this calcium hydroxide at the PCC surface (or that is brought to the surface if the PCC surface is etched, such as by addition of an acid), forms a layer at this surface within which an equilibrium is established between liberated calcium and hydroxide ions and calcium hydroxide still associated with the PCC surface. The Applicant theorises that on simple addition of the medium-strong to strong $H_3O^+$ ion-provider (hereafter referred to as acid) via a compound which also serves as the anion source, as is the most common case in EP 1 149 136 where $H_3PO_4$ is implemented, this acid is neutralised on encountering the hydroxide ions at the PCC surface, and this neutralisation influences the equilibrium in place between the calcium and hydroxide ions and surface-associated calcium hydroxide within the mentioned PCC surface layer, such that an excess of calcium ions are generated at the PCC surface, driving rapid precipitation of this calcium, not so that outward, surface generating growth of an at least partially crystalline material continues, as desired, beyond the limits of this surface layer, but rather so that an at least partially crystalline material forms on the PCC surface in immediate proximity, essentially encompassing this PCC and rendering it unreactive on further acid addition.

The Applicant believes that it is necessary to act against this phenomenon by acting on the equilibrium in place within said layer to limit the concentration of free hydroxyl groups therein, which would otherwise neutralise the $H_3O^+$ ions needed to liberate calcium from PCC and thereby prevent surface area generation. The Applicant has found that this may be achieved by increasing the solubilised calcium ion concentration, namely by providing more solubilised calcium ions than would be generated by the acidic or acid salt form of the anion alone. It is of note that these additionally provided solubilised calcium ions do not serve to directly form the desired at least partially crystalline material so much as they act to ensure that the equilibrium at the PCC surface is such that needed calcium ions can continue to be obtained from PCC.

The amount of calcium hydroxide present at the PCC surface and that generates the equilibrium layer will vary as a function of the PCC synthesis conditions. Thus, the amount of additionally provided solubilised calcium ions has to be adapted, so that specific surface area is generated.

Characterisation of Step a): PCC-Comprising Pigment Starting Material

According to Step a) of the process of the present invention, a) at least one pigment comprising precipitated calcium carbonate (PCC) is provided.

It is among the merits of the Applicant that he has identified specific reaction condition that allows for the generation of surface area on contacting a PCC-comprising pigment with an anion and $H_3O^+$ ions, via the formation of a calcium crystal, wherein the calcium source is essentially the PCC starting material, ie. the PCC provided in the pigment of step a). Moreoever, the Applicant has identified the conditions such that this process functions when using any form of PCC in the pigment starting material, including calcitic polymorphs such as scalenohedral or rhombohedral calcite, or metastable vaterite and aragonite.

Indeed, the PCC in said PCC-comprising pigment of Step a) may, optionally, be synthesised in the presence of crystal modifiers, such as EDTA or other chelants.

Preferably, upon wet grinding said PCC-comprising pigment under the following conditions, the pH of the wet grinding slurry is observed to rise to a greater extent than would be observed upon grinding a corresponding slurry wherein said PCC is entirely replaced with calcitic GCC, attesting to the release of unreacted hydroxide from said PCC:

1) replacing the aqueous phase of the slurry with deionised water to form a slurry featuring a solids content, as measured according to the measurement method provided in the Examples section herebelow, of 15% by weight;
2) grinding the slurry of Step 1) in a grinding chamber using aluminium oxide grinding beads having a diameter of between 1.0 and 1.6 mm, added in an amount so as to fill approximately 80% of the volume of the grinding chamber, and at a grinding speed of 2500 rpm at 24° C. for 180 minutes, under a slurry re-circulation rate of 700 ml/minutes.

Namely, the pH, as measured according to the measurement method provided in the Examples section herebelow, is observed to rise by more than 2 during this grinding.

In a preferred embodiment, the PCC of said PCC-comprising pigment of Step a) is hydrophilic, as determined in accordance with the measurement method provided in the Examples section herebelow.

In a preferred embodiment, the PCC of said PCC-comprising pigment of Step a) is issued from a process of involving at least one step of comminution. A step of comminution is defined as a mechanical processing step resulting in the reduction of the original particle size. Such comminution steps may, for examples, be performed under conditions such that refinement predominantly results from impacts with a secondary body, ie. in one or more of: a ball mill, a rod mill, a vibrating mill, a roll crusher, a centrifugal impact mill, an attrition mill, a pin mill, a hammer mill, a pulveriser, a shredder, a de-clumper, a knife cutter, or other such equipment known to the skilled man, or may be performed under conditions such that autogenous grinding takes place.

In a preferred embodiment, the PCC of said PCC-comprising pigment of Step a) has a weight median diameter of 0.01 to 10 μm, and more preferably of 0.5 to 2 μm, as measured according to the measurement method provided in the Examples section herebelow.

In an optional embodiment, said PCC-comprising pigment of Step a) also comprises one or more of the following: talc, clay, plastic hollow-sphere pigments or titanium dioxide.

In another embodiment, said PCC-comprising pigment of Step a) consists solely of PCC.

In a preferred embodiment, said PCC-comprising pigment of Step a) is provided in the form of an aqueous slurry.

In this preferred embodiment, said slurry preferably has a pH of less than 11, preferably of less than 10.5, as measured according to the measurement method described in the Examples section herebelow, prior to Step c).

In this preferred embodiment, said PCC-comprising pigment is optionally dispersed. Conventional dispersants known to the skilled person can be used. The dispersant can be anionic or cationic. A preferred dispersant is one based on polyacrylic acid. Such dispersants are preferably dosed so as to account for 0.35% by weight of the weight of said PCC-comprising pigment.

Characterisation of Step b): $H_3O^+$ Ion Source

According to Step b) of the process of the present invention, $H_3O^+$ ions are provided. Said $H_3O^+$ ions serve to partially dissolve PCC, generating calcium ions for subsequent precipitation of an insoluble, at least partially crystalline calcium salt of the anion at the PCC surface.

Said $H_3O^+$ ions may be provided via one or more of the following Routes:

Route IB: addition of acid or an acid salt of said anion;

Route IIB: addition of an acid or an acid salt which simultaneously serves to provide all or part of said excess solubilised calcium ions, ie. by direct addition of soluble calcium ions and/or by dissolution of the PCC starting material to liberate calcium ions.

In the case of Route IIB, said acid or acid salt which simultaneously serves to provide all or part of said excess solubilised calcium ions is preferably selected from the group comprising sulphur-comprising acids, such as sulphuric acid, hydrochloric acid, perchloric acid, formic acid, lactic acid, acetic acid, nitric acid, and acid salts thereof, such as soluble calcium acid salts thereof.

Especially, said acid or acid salt is selected from the group comprising sulphur-comprising acids, such as sulphuric acid, hydrochloric acid, acetic acid and acid salts thereof, such as soluble calcium acid salts thereof.

Preferably, following the addition of said $H_3O^+$ ions to the slurry, the pH of this slurry, as measured according to the measurement method given in the Examples section herebelow, drops temporarily to a value below 6.0.

Characterisation of Step c): Anion Forming the Insoluble Calcium Crystal on PCC

According to Step c) of the process of the present invention, at least one anion, being capable of forming water-insoluble calcium salts, said anion being solubilised in an aqueous medium, is provided. Said insoluble corresponding calcium salt may, in addition to said anion, include OH— ions and/or crystal water.

Said anion of Step c) may be added in the form of a soluble neutral or acid salt, or in the form of an acid, provided it is solubilised before and/or during Step d).

Said anion may be generated by speciation of an additive provided to the process. For example, $PO_4^{3-}$ and $HPO_4^{2-}$ may be generated via addition of $H_3PO_4$ or a salt of $H_2PO_4^-$.

Preferably, said anion is selected from one or more of the following: phosphate-comprising anions such as $PO_4^{3-}$ and $HPO_4^{2-}$, oxalate anions $(C_2O_4^{2-})$, carbonate-comprising anions in the form of $CO_3^{2-}$, phosphonate anions, succinate anions, or fluoride anions. More preferably, said anion is selected from among: phosphate-comprising anions such as $PO_4^{3-}$ and $HPO_4^{2-}$, oxalate anions $(C_2O_4^{2-})$, phosphonate anions, succinate anions, and fluoride anions. Most preferably, said anion is a phosphate-comprising anion such as $PO_4^{3-}$ and $HPO_4^{2-}$.

In the embodiment where a carbonate-comprising anion is implemented, said carbonate-comprising anion may be generated in situ via the introduction of gaseous $CO_2$ to the slurry. In such a case, the skilled man will know how to implement this introduction in order to favour the conversion of $CO_2$ to $CO_3^{2-}$, such as through the selection of the appropriate temperature.

In a preferred embodiment, said anion is added in a quantity corresponding to between 5 and 50%, preferably between 15 and 30%, by weight based on the weight of said PCC provided in Step a).

Characterisation of Step d): Contacting the PCC-Comprising Pigment and the Anion According to Step d) of the process of the present invention, said PCC-comprising pigment is contacted, either simultaneously or in distinct steps, with said $H_3O^+$ ions and with said solubilised anions in an aqueous slurry environment.

In a preferred embodiment, said anion is contacted with said PCC after contacting said PCC with said $H_3O^+$ ions.

Moreoever, the process of the present invention is characterised in that excess solubilised calcium ions are provided during Step d).

Said excess solubilised calcium ions are preferably provided via one or more of the following Routes:

Route IA: addition of a soluble neutral or acid calcium salt;

Route IIA: addition of an acid or a neutral or acid non-calcium salt which generates a soluble neutral or acid calcium salt in situ.

In the case where said excess solubilised calcium ions are provided via Route IA, it may, for example be added as $CaCl_2$ or $Ca(NO_3)_2$.

The solubilised calcium ions are preferably provided in a quantity corresponding to greater than or equal to 3%, preferably greater than or equal to 5%, by weight based on the weight of said PCC provided in Step a).

In a preferred embodiment, Step d) is carried out at temperatures of above 50° C., and preferably of above 60° C.

In a preferred embodiment, Step d) the slurry is mixed so as to develop an essentially laminar flow.

In an optional embodiment, Step d) takes place in the presence of at least one compound selected from the group consisting of silicate, silica, earth alkali metal aluminate, or mixtures thereof.

In this optional embodiment, said silicate is preferably selected from an aluminium silicate, or an earth alkali metal silicate.

In an optional embodiment, Step d) takes place in the presence of an inert gas, which is bubbled through the slurry. One such gas may be $CO_2$, provided that the when the skilled man implements $CO_2$ as an inert gas, he adapts the slurry conditions to limit the conversion of this $CO_2$ to a soluble carbonate.

In an optional embodiment, Step d) takes place in the presence of a further additive which increases the ionic strength of the slurry, such as an inert, non-calcium salt. Such salts include, for example, NaCl or $KNO_3$.

In a preferred embodiment, the aqueous phase of the obtained surface-reacted PCC slurry may be replaced with deionised water. In a more preferred embodiment, the aqueous phase of said surface-reacted PCC slurry is collected and recirculated into the process according to the present invention as a means to provide all or part of the solubilised calcium ions. This is particularly of interest when the process according to the invention is a continuous process.

The obtained surface-reacted PCC slurry may be concentrated, optionally up to the point of obtaining a dry surface-reacted PCC product. In the case of a dry product, this product may additionally be treated with fatty acids. In the case of a dry product, this product may be additionally washed with water.

Thus, a slurry of surface-reacted PCC-comprising pigment is obtained, wherein said surface-reacted PCC comprises an insoluble, at least partially crystalline calcium salt of said anion, which preferably extends from the surface of at least part of the PCC of said PCC-comprising pigment; provided in Step a).

This surface-reacted PCC features a BET specific surface area that is greater than the BET specific surface area obtained following contacting the same PCC provided in Step a), either simultaneously or in distinct steps, with the same solubilised anion of Step b) and with $H_3O^+$ ions, such that:
  the $H_3O^+$ ions are provided solely via the addition of said anion, ie. said $H_3O^+$ ions are provided in a molar quantity that is less than or equal to that required to theoretically balance the ionic charge of said anion; and,
  neither Route IA nor Route IB are implemented.

In a preferred embodiment, the resulting surface-reacted PCC has a BET specific surface area that is at least three times, and more preferably seven times, greater than the BET specific surface area of the PCC in the PCC-comprising pigment provided in Step a).

Said BET specific surface area and all BET specific surface areas relating to the present invention are determined in accordance with the measurement method defined in the Examples section herebelow.

In a preferred embodiment, the obtained slurry comprising surface-reacted PCC has a solids content, as measured according to the measurement method described in the Examples section hereafter, of up to 25%, preferably between 5 and 20% by weight.

In a preferred embodiment, a dispersant is added to said slurry.

Preferably, upon wet grinding said surface-reacted PCC-comprising pigment under the following conditions, the pH of the wet grinding slurry is observed to rise by at least 2 during this wet grinding process:
1) replacing the aqueous phase of the slurry with deionised water to form a slurry featuring a solids content, as measured according to the measurement method provided in the Examples section herebelow, of 15% by weight;
2) grinding the slurry of Step 1) in a grinding chamber using aluminium oxide grinding beads having a diameter of between 1.0 and 1.6 mm, added in an amount so as to fill approximately 80% of the volume of the grinding chamber, and at a grinding speed of 2500 rpm at 24° C. for 180 minutes, under a slurry re-circulation rate of 700 ml/minutes.

In a preferred embodiment, said surface-reacted PCC has a calcium salt of the anion: calcium carbonate content mass ratio of 5:95 to 95:5, preferably of 20:80 to 60:40, and more preferably of 25:75 to 50:50, as determined according to the TGA measurement described in the Examples section herebelow.

Said surface-reacted PCC preferably has a pore volume of 1 to 2.2 $cm^3/g$, as determined according to the measurement method provided in the Examples section herebelow.

Said surface-reacted PCC preferably has a BET specific surface area of from 20 to 120 $m^2/g$, preferably from 55 to 115 $m^2/g$, more preferably from 60 to 100 $m^2/g$, as determined according to the measurement method provided in the Examples section herebelow.

Upon XRD analysis of said surface-reacted PCC, according to the measurement method provided in the Examples section herebelow, said XRD analysis preferably presents the peaks corresponding to an at least partially crystalline calcium of the anion. In a preferred embodiment, said salts include one or more of the following: octacalcium phosphate (OCP), hydroxyapatite (HAP) or tricalcium phosphate (TCP).

Said surface-reacted PCC slurry may be used in paper, tissue paper, plastics, paints, water treatment and to remove EDC compounds.

The following examples illustrate the invention without restricting its scope.

EXAMPLES

Measurement Methods
  The following measurement methods are used to evaluate the parameters given in the examples and claims.
Hydrophilicity of a Material
  Materials were classified as hydrophilic or not according to the following test. 50 ml of each of the following mixture of water:ethanol are prepared in 100 ml beakers: 100:0, 90:10, 80:20, 70:30, 60:40, 50:50, 40:60, 30:70, 20:80, 10:90, 0:100. Thereafter, 0.5 g of the material to be tested is passed through a sieve located over the mouth of the beaker (under slight agitation of this sieve to ensure that all of the material passes through it, said sieve openings being sized so as to allow the slowed passage of the material under slight agitation), and allowed to fall freely upon the liquid surface. As of the moment that sieving is completed, the behaviour of the material at the liquid surface is observed over a period of 5 minutes to assign a grade to the material in each beaker as follows:
0=essentially all of the material sinks within 30 seconds;
0.25=essentially all of the material sinks within 5 minutes;
0.5=more than 50% of the material sinks within 5 minutes;
0.75=more than 25% of the material sinks within 5 minutes;
1=essentially none of the filler sinks within 5 minutes.
  The grades assigned are plotted as a function of the water:ethanol ratio. Materials were classified as hydrophilic a zero value was observed for a water:ethanol mixture of 100:0 to 50:50.
Pore Volume of a Material
  Tablets were made from suspensions of the material to be tested. The tablets are formed by applying a constant pressure to the suspension/slurry for several hours such that water is released by filtration through a fine 0.025 μm filter membrane resulting in a compacted tablet of the pigment. The tablets are removed from the apparatus and dried in an oven at 80° C. for 24 hours.

Once dried, single portions from each of the tablet blocks were characterised by mercury porosimetry for both porosity and pore size distribution using a Micromeritics Autopore IV mercury porosimeter. The maximum applied pressure of mercury was 414 MPa, equivalent to a Laplace throat diameter of 0.004 μm (i.e. ~nm). The mercury intrusion measurements were corrected for the compression of mercury, expansion of the penetrometer and compressibility of the solid phase of the sample. Further details of the measuring method are described in *Transport in Porous Media* (2006) 63: 239-259.

Specific Surface Area (SSA) of a Material

The specific surface area is measured via the BET method according to ISO 9277 using nitrogen, following conditioning of the sample by heating at 250° C. for a period of 30 minutes. Prior to such measurements, the sample is filtered, rinsed and dried at 110° C. in an oven for at least 12 hours.

Particle Size Distribution (Mass % Particles with a Diameter <X) and Weight Median Grain Diameter ($d_{50}$) of a Particulate Material Weight median grain diameter and grain diameter mass distribution of a particulate material are determined via the sedimentation method, i.e. an analysis of sedimentation behaviour in a gravimetric field. The measurement is made with a Sedigraph™ 5120.

The method and the instrument are known to the skilled person and are commonly used to determine grain size of fillers and pigments. The measurement is carried out in an aqueous solution of 0.1 wt % $Na_4P_2O_7$. The samples were dispersed using a high speed stirrer and ultrasonic.

X-Ray Diffraction (XRD)

Crystallographic structures of materials were identified based on the XRD analytical technique using Brucker AXS: D8 Advance instrumentation, scanning 2 to 70° 2theta at a scanning speed of 0.5 seconds/step and a step size of 0.01° 2theta. Analysis of the resulting spectra was based on the PDF 2 database of reference spectra issued by the International Centre for Diffraction Data.

pH of an Aqueous Slurry

The pH of the aqueous suspension is measured using a standard pH-meter at approximately 22° C.

pH Rise on Wet Grinding a Material

The pH rise observed on wet grinding a material is evaluated according to the following process:

1) the aqueous phase of the slurry is replaced with deionised water to form a slurry featuring a solids content, as measured according to the measurement method provided in the Examples section herebelow, of 15% by weight;
2) the slurry of Step 1) is ground in a grinding chamber using aluminium oxide grinding beads having a diameter of between 1.0 and 1.6 mm, added in an amount so as to fill approximately 80% of the volume of the grinding chamber, and at a grinding speed of 2500 rpm at 24° C. for 180 minutes, under a slurry re-circulation rate of 700 ml/minutes, and measuring the pH over time.

Solids Content of an Aqueous Slurry

The slurry solids content (also known as "dry weight") is determined using a Moisture Analyser HR73 commercialised by Mettler-Toledo with the following settings: temperature of 120° C., automatic switch off 3, standard drying, 5-20 g of slurry.

Calcium Anion Salt:Calcium Carbonate Mass Ratio in a Sample of Material

Calcium anion salt:calcium carbonate mass ratio was evaluated based on the weight of calcium carbonate in a dried and washed sample of material, which is determined by thermogravimetric analysis (TGA) using a Mettler Toledo TGA 851 using a sample of 500+/−50 mg and scanning temperatures as follows:

25 to 200° C. at a rate of 20° C./minute;
200° C. maintained 15 minutes;
200 to 400° C. at a rate of 20° C./minute;
400° C. maintained 15 minutes;

under an air flow of 80 ml/min and a nitrogen gas flow of 15 ml/min. This measurement provides a mass of $CO_2$ gas released from the sample, relative to which a mass of calcium carbonate is calculated. The difference between this calculate mass of calcium carbonate and the mass of the sample provided corresponds to the mass of calcium anion salt Preparation of PCC-Comprising Pigments of Step a)

The following is a description of the preparation of the PCC-comprising pigments of Step a) implemented in subsequent tests described hereafter.

Preparation of a Slurry of Undispersed, Scalenohedral and Calcitic PCC (PCC1)

PCC 1 was synthesised by bubbling $CO_2$ through a slurry of calcium hydroxide so as to obtain a product in slurry featuring the specific surface area and weight median particle diameter, as determined according to the measurement methods hereabove, given in Table 1, and formed of essentially the scalenohedral morphology of the calcite phase as determined by XRD analysis. The slurry solids was adjusted to 17% by weight. The pH of this slurry, as measured according to the measurement method given above, was between 8 and 9.5.

A sample of this PCC was subsequently wet ground to measure the pH evolution, according to the test method given above. During this grinding, the slurry pH was observed to rise by more than 2 and more than a corresponding slurry wherein the surface-reacted PCC was entirely replaced with GCC.

A sample of this PCC was also subjected to the hydrophilicity test given above, and determined to be hydrophilic.

Preparation of a Slurry of Dispersed, Scalenohedral and Calcitic PCC (PCC2)

PCC2 was synthesised by bubbling $CO_2$ through a slurry of calcium hydroxide so as to obtain a product in slurry featuring the specific surface area and weight median particle diameter, as determined according to the measurement methods hereabove, given in Table 1, and formed of essentially the scalenohedral morphology of the calcite phase as determined by XRD analysis. The slurry solids was adjusted to 40% by weight in the presence of a polyacrylate-based dispersant. The pH of this slurry, as measured according to the measurement method given above, was between 8 and 9.5.

A sample of this PCC was subsequently wet ground to measure the pH evolution, according to the test method given above. During this grinding, the slurry pH was observed to rise by more than 2 and more than a corresponding slurry wherein the surface-reacted PCC was entirely replaced with GCC.

A sample of this PCC was also subjected to the hydrophilicity test given above, and determined to be hydrophilic.

Preparation of a Slurry of Undispersed, Aragonitic PCC (PCC3)

PCC3 was synthesised by bubbling $CO_2$ through a slurry of calcium hydroxide so as to obtain a product in slurry featuring the specific surface area and weight median particle diameter, as determined according to the measurement methods hereabove, given in Table 1, and formed of essentially the aragonitic morphology as determined by XRD analysis. The slurry solids was adjusted to 17% by weight. The pH of this slurry, as measured according to the measurement method given above, was between 8 and 9.5.

A sample of this PCC was subsequently wet ground to measure the pH evolution, according to the test method given above. During this grinding, the slurry pH was observed to rise by more than 2 and more than a corresponding slurry wherein the surface-reacted PCC was entirely replaced with GCC.

A sample of this PCC was also subjected to the hydrophilicity test given above, and determined to be hydrophilic.

Preparation of a Slurry of Undispersed, Rhombohedral PCC (PCC4)

PCC4 was synthesised by bubbling $CO_2$ through a slurry of calcium hydroxide so as to obtain a product in slurry featuring the specific surface area and weight median particle diameter, as determined according to the measurement methods hereabove, given in Table 1, and formed of essentially the rhomobohedral morphology as determined by XRD analysis. The slurry solids was adjusted to 17% by weight. The pH of this slurry, as measured according to the measurement method given above, was between 8 and 9.5.

A sample of this PCC was subsequently wet ground to measure the pH evolution, according to the test method given above. During this grinding, the slurry pH was observed to rise by more than 2 and more than a corresponding slurry wherein the surface-reacted PCC was entirely replaced with GCC.

A sample of this PCC was also subjected to the hydrophilicity test given above, and determined to be hydrophilic.

Example 1

The following Example is illustrative the prior art, and involves contacting a PCC pigment with $H_3O^+$ and a phosphate-comprising anion in the absence of additional soluble calcium ions.

In a stainless steel reactor, an aqueous slurry is prepared by adjusting the solids content of the aqueous slurry of the PCC described in the Table hereinbelow, such that the slurry obtained has a solids content of 10% by dry weight. The temperature of this slurry is thereafter brought to and maintained at 70° C.

Under stirring such that an essentially laminar flow is established, $H_3PO_4$ in an amount corresponding to 30% by weight on PCC weight and to approximately $3 \times 10^{-3}$ moles $H_3PO_4$ per gram PCC is added to the PCC slurry over a period of 10 minutes. Following this addition, the slurry is stirred for an additional 5 minutes.

The resulting slurry is allowed to sit overnight before filtering and drying the obtained product. The final specific surface area of this dry product is the measured and reported in the Table below.

TABLE 1

| | Test | | | |
|---|---|---|---|---|
| | 1 Prior Art | 2 Prior Art | 3 Prior Art | 4 Prior Art |
| PCC type | PPC1 | PCC2 | PCC3 | PCC4 |
| Weight median particle diameter (μm) | 2.0 | 1.8 | 2.7 | 1.1 |
| SSA starting material (m²/g) | 8 | 8 | 6.3 | 5.5 |
| SSA final product (m²/g) | 54 | 18 | 15 | 19 |

Example 2

The following Example is illustrative of the invention, and involves contacting PCC1 with a phosphate-comprising anion (provided in the form of an acid), in the presence of excess soluble calcium ions, where soluble calcium ions are generated on contacting the PCC with an acid or an acid salt having a soluble corresponding calcium salt.

In a stainless steel reactor, an aqueous slurry is prepared by adjusting the solids content of the aqueous slurry of PCC1 described hereabove, such that the slurry obtained has a solids content of 10% by dry weight. The temperature of this slurry is thereafter brought to and maintained at a reaction temperature defined in the Table hereinbelow under "Tslurry".

Under stirring such that an essentially laminar flow is established, an acid or an acid salt having a soluble corresponding calcium salt (Additive1) in an amount corresponding to a given mole equivalents $H_3O^+$ ions per gram PCC on contacting the precipitated calcium carbonate (which corresponds to a generation of a given mole equivalents of solubilised calcium ions, per gram PCC, both of these given values being listed in the Table hereinbelow), is added to the PCC slurry.

Thereafter, $H_3PO_4$ in an amount corresponding to 30% by weight on PCC weight and to approximately $3 \times 10^{-3}$ moles $H_3PO_4$ per gram PCC is added to this slurry over a period of 10 minutes. Following this addition, the slurry is stirred for an additional 5 minutes. During this period, the pH of the slurry was observed to decrease temporarily to a value of less than 6.0.

The final solids of the obtained slurry was between 8 and 12% by weight.

The resulting slurry is allowed to sit overnight before filtering and drying the obtained product. The final specific surface area of this dry product is measured and listed in the Table hereinbelow. Test 1 of Example 1 is also listed in the Table hereinbelow as a reference.

TABLE 2

| | Test | | | | |
|---|---|---|---|---|---|
| | 1 Prior Art | 1A Invention | 1B Invention | 1C Invention | 1D Invention |
| Tslurry (° C.) | 70 | 70 | 70 | 95 | 70 |
| Additive1 | — | HCl | HCl | HCl | Acetic acid |
| Moles equivalents $H_3O^+$ per gram PCC ($\times 10^{-3}$)** | — | 5.5 | 2.7 | 5.5 | 6.6 |
| Equivalent moles $Ca^{2+}$ ions per gram PCC ($\times 10^{-3}$) | — | 2.7 | 1.4 | 2.7 | 3.3 |

TABLE 2-continued

|  | Test | | | | |
| --- | --- | --- | --- | --- | --- |
|  | 1 Prior Art | 1A Invention | 1B Invention | 1C Invention | 1D Invention |
| Equivalent mass $Ca^{2+}$ ions per gram PCC ($\times 10^{-3}$) | — | 108 | 54 | 108 | 132 |
| SSA ($m^2/g$) | 50 | 77 | 88 | 63 | 98 |

**assuming full dissociation of Additive1

In all case, when the product obtained according to the process of the invention was wet ground according to the method provided above, the pH during wet grinding rose by more than 2 and more than a corresponding slurry wherein the surface-reacted PCC was entirely replaced with GCC.

In all case, when the product obtained according to the process of the invention was analysed by TGA as described above, a calcium anion salt:calcium carbonate mass ratio of between 20:80 and 60:40 was observed.

XRD analyses of the products obtained according to the process of the invention indicated the presence of calcium phosphate minerals as well as calcium carbonate.

Example 3

The following Example is illustrative of the invention, and involves contacting PCC1 with a phosphate-comprising anion (provided in the form of an acid), in the presence of excess soluble calcium ions, where soluble calcium ions are generated on contacting the PCC with an acid or an acid salt having a soluble corresponding calcium salt, and where said acid or acid salt is dosed at the same time as the phosphate-comprising anion.

In a stainless steel reactor, an aqueous slurry is prepared by adjusting the solids content of the aqueous slurry of PCC1 described hereabove, such that the slurry obtained has a solids content of 10% by dry weight. The temperature of this slurry is thereafter brought to and maintained at a reaction temperature defined in the Table herebelow under "Tslurry".

Under stirring such that an essentially laminar flow is established, an acid or an acid salt having a soluble corresponding calcium salt (Additive1) in an amount corresponding to a given mole equivalents $H_3O^+$ ions per gram PCC on contacting the precipitated calcium carbonate (which corresponds to a generation of a given mole equivalents of solubilised calcium ions, per gram PCC, both of these given values being listed in the Table herebelow), is added to the PCC slurry, whiles simultaneously adding $H_3PO_4$ in an amount corresponding to 30% by weight on PCC weight and to approximately $3\times 10^{-3}$ moles $H_3PO_4$ per gram PCC is added to this slurry over a period of 10 minutes. Following this addition, the slurry is stirred for an additional 5 minutes. During this period, the pH of the slurry was observed to decrease temporarily to a value of less than 6.0.

The final solids of the obtained slurry was between 8 and 12% by weight.

The resulting slurry is allowed to sit overnight before filtering and drying the obtained product. The final specific surface area of this dry product is measured and listed in the Table herebelow.

Test 1 of Example 1 is also listed in the Table herebelow as a reference.

TABLE 3

|  | Test | |
| --- | --- | --- |
|  | 1 Prior Art | 1E Invention |
| Tslurry (° C.) | 70 | 70 |
| Additive1 | — | $H_2SO_4$ |
| Moles equivalents $H_3O^+$ per gram PCC ($\times 10^{-3}$)** | — | 4.0 |
| Equivalent moles $Ca^{2+}$ ions per gram PCC ($\times 10^{-3}$) | — | 2.0 |
| Equivalent mass $Ca^{2+}$ ions per gram PCC ($\times 10^{-3}$) | — | 80 |
| SSA ($m^2/g$) | 50 | 115 |

**assuming full dissociation of Additive1

In all case, when the product obtained according to the process of the invention was wet ground according to the method provided above, the pH during wet grinding rose by more than 2 and more than a corresponding slurry wherein the surface-reacted PCC was entirely replaced with GCC.

In all case, when the product obtained according to the process of the invention was analysed by TGA as described above, a calcium anion salt:calcium carbonate mass ratio of between 20:80 and 60:40 was observed.

XRD analyses of the products obtained according to the process of the invention indicated the presence of calcium phosphate minerals as well as calcium carbonate.

Example 4

The following Example is illustrative of the invention, and involves contacting PCC1 with a phosphate-comprising anion (provided in the form of an acid), in the presence of excess soluble calcium ions, where soluble calcium ions are provided by the addition of a soluble neutral calcium salt.

In a stainless steel reactor, an aqueous slurry is prepared by adjusting the solids content of the aqueous slurry of PCC1 described hereabove, such that the slurry obtained has a solids content of 10% by dry weight. The temperature of this slurry is thereafter brought to and maintained at a reaction temperature defined in the Table herebelow under "Tslurry".

Under stirring such that an essentially laminar flow is established, a soluble neutral calcium salt (Additive1) in an amount corresponding to a given mole equivalents $Ca^{2+}$ ions per gram PCC (values being listed in the Table herebelow), is added to the PCC slurry.

Thereafter, $H_3PO_4$ in an amount corresponding to 30% by weight on PCC weight and to approximately $3\times 10^{-3}$ moles $H_3PO_4$ per gram PCC is added to this slurry over a period of 10 minutes. Following this addition, the slurry is stirred for an additional 5 minutes. During this period, the pH of the slurry was observed to decrease temporarily to a value of less than 6.0.

The final solids of the obtained slurry was between 8 and 12% by weight.

The resulting slurry is allowed to sit overnight before filtering and drying the obtained product. The final specific surface area of this dry product is measured and listed in the Table herebelow. Test 1 of Example 1 is also listed in the Table herebelow as a reference.

TABLE 4

|  | Test | | |
| --- | --- | --- | --- |
|  | 1 Prior Art | 1F Invention | 1G Invention |
| Tslurry (° C.) | 70 | 70 | 70 |
| Additive1 | — | $CaCl_2$ | $Ca(NO_3)_2$ |
| Equivalent moles $Ca^{2+}$ ions per gram PCC ($\times 10^{-3}$)** | — | 1.4 | 1.2 |
| Equivalent mass $Ca^{2+}$ ions per gram PCC ($\times 10^{-3}$) | — | 56 | 48 |
| SSA ($m^2/g$) | 54 | 80 | 90 |

**assuming full dissociation of Additive1

In all case, when the product obtained according to the process of the invention was wet ground according to the method provided above, the pH during wet grinding rose by more than 2 and more than a corresponding slurry wherein the surface-reacted PCC was entirely replaced with GCC.

In all case, when the product obtained according to the process of the invention was analysed by TGA as described above, a calcium anion salt:calcium carbonate mass ratio of between 20:80 and 60:40 was observed.

XRD analyses of the products obtained according to the process of the invention indicated the presence of calcium phosphate minerals as well as calcium carbonate.

Example 5

The following Example is illustrative of the invention, and involves contacting PCC1 with a phosphate-comprising anion (provided in the form of a salt), in the presence of excess soluble calcium ions, where the soluble calcium ions are generated on contacting the PCC with an acid or an acid salt having a soluble corresponding calcium salt.

In a stainless steel reactor, an aqueous slurry is prepared by adjusting the solids content of the aqueous slurry of PCC1 described hereabove, such that the slurry obtained has a solids content of 10% by dry weight. The temperature of this slurry is thereafter brought to and maintained at a reaction temperature defined in the Table herebelow under "Tslurry".

Under stirring such that an essentially laminar flow is established, an acid or an acid salt having a soluble corresponding calcium salt (Additive1) in an amount corresponding to a given mole equivalents $H_3O^+$ ions per gram PCC on contacting the precipitated calcium carbonate (which corresponds to a generation of a given mole equivalents of solubilised calcium ions, per gram PCC, both of these given values being listed in the Table herebelow), is added to the PCC slurry.

Thereafter, $Na_{(3-x)}H_xPO_4$ where x=0-1 (the value of x being indicated in the Table below) in an amount corresponding to approximately $3 \times 10^{-3}$ moles $Na_{(3-x)}H_xPO_4$ per gram PCC is added to this slurry over a period of 10 minutes. Following this addition, the slurry is stirred for an additional 5 minutes. During this period, the pH of the slurry was observed to decrease temporarily to a value of less than 6.0.

The final solids of the obtained slurry was between 8 and 12% by weight.

The resulting slurry is allowed to sit overnight before filtering and drying the obtained product. The final specific surface area of this dry product is measured and listed in the Table herebelow. Test 1 of Example 1 is also listed in the Table herebelow as a reference.

TABLE 5

|  | | X = 0 | X = 1 |
| --- | --- | --- | --- |
|  | Test | | |
|  | 1 Prior Art | 1H Invention | 1J Invention |
| Tslurry (° C.) | 70 | 70 | 70 |
| Additive1 | — | HCl | HCl |
| Moles equivalents $H_3O^+$ per gram PCC ($\times 10^{-3}$)** | — | 5.5 | 5.5 |
| Equivalent moles $Ca^{2+}$ ions per gram PCC ($\times 10^{-3}$) | — | 2.7 | 2.7 |
| Equivalent mass $Ca^{2+}$ ions per gram PCC ($\times 10^{-3}$) | — | 108 | 108 |
| SSA ($m^2/g$) | 50 | 55 | 108 |

**assuming full dissociation of Additive1

In all case, when the product obtained according to the process of the invention was wet ground according to the method provided above, the pH during wet grinding rose by more than 2 and more than a corresponding slurry wherein the surface-reacted PCC was entirely replaced with GCC.

In all case, when the product obtained according to the process of the invention was analysed by TGA as described above, a calcium anion salt:calcium carbonate mass ratio of between 20:80 and 60:40 was observed.

XRD analyses of the products obtained according to the process of the invention indicated the presence of calcium phosphate minerals as well as calcium carbonate.

Example 6

The following Example is illustrative of the invention, and involves contacting PCC1 or PCC2 with a phosphate-comprising anion (provided in the form of an acid), in the presence of excess soluble calcium ions, where soluble calcium ions are generated on contacting the PCC with an acid or an acid salt having a soluble corresponding calcium salt, in the presence of a further additional additive which increases the ionic strength of the slurry.

In a stainless steel reactor, an aqueous slurry is prepared by adjusting the solids content of the aqueous slurry of PCC1 or PCC2 described hereabove, such that the slurry obtained has a solids content of 10% by dry weight. The temperature of this slurry is thereafter brought to and maintained at a reaction temperature defined in the Table herebelow under "Tslurry".

Under stirring such that an essentially laminar flow is established, an acid or an acid salt having a soluble corresponding calcium salt (Additive1) in an amount corresponding to a given mole equivalents $H_3O^+$ ions per gram PCC on contacting the precipitated calcium carbonate (which corresponds to a generation of a given mole equivalents of solubilised calcium ions, per gram PCC, both of these given values being listed in the Table herebelow), is added to the PCC slurry.

Under continued stirring, a neutral, soluble salt capable of increasing the ionic strength of the slurry is added (Additive 2), in an amount listed in the Table herebelow.

Thereafter, $H_3PO_4$ in an amount corresponding to 30% by weight on PCC and to approximately $3 \times 10^{-3}$ moles $H_3PO_4$ per gram PCC is added to this slurry over a period of 10 minutes. Following this addition, the slurry is stirred for an additional 5 minutes. During this period, the pH of the slurry was observed to decrease temporarily to a value of less than 6.0.

The final solids of the obtained slurry was between 8 and 12% by weight.

The resulting slurry is allowed to sit overnight before filtering and drying the obtained product. The final specific surface area of this dry product is measured and listed in the Table herebelow. Test 1 of Example 1 is also listed in the Table herebelow as a reference.

TABLE 6

|  | PCC1 | | | PCC2 | | |
| --- | --- | --- | --- | --- | --- | --- |
|  | Test | | | | | |
|  | 1 Prior Art | 1L Invention | 1M Invention | 2 Prior Art | 2A Invention | 2B Invention |
| Tslurry (° C.) | 70 | 70 | 70 | 70 | 70 | 70 |
| Additive1 | — | HCl | HCl | — | HCl | HCl |
| Moles equivalents $H_3O^+$ per gram PCC ($\times 10^{-3}$)** | — | 5.5 | 5.5 | — | 5.5 | 5.5 |
| Equivalent moles $Ca^{2+}$ ions per gram PCC ($\times 10^{-3}$) | — | 2.7 | 2.7 | — | 2.7 | 2.7 |
| Equivalent mass $Ca^{2+}$ ions per gram PCC ($\times 10^{-3}$) | — | 108 | 108 | — | 108 | 108 |
| Additive2 | — | NaCl | $KNO_3$ | — | NaCl | $KNO_3$ |
| % weight Additive2 on PCC weight | — | 0.1 | 0.1 | — | 0.1 | 0.1 |
| SSA ($m^2/g$) | 54 | 61 | 75 | 18 | 48 | 45 |

**assuming full dissociation of Additive1

In all case, when the product obtained according to the process of the invention was wet ground according to the method provided above, the pH during wet grinding rose by more than 2 and more than a corresponding slurry wherein the surface-reacted PCC was entirely replaced with GCC.

In all case, when the product obtained according to the process of the invention was analysed by TGA as described above, a calcium anion salt:calcium carbonate mass ratio of between 20:80 and 60:40 was observed.

XRD analyses of the products obtained according to the process of the invention indicated the presence of calcium phosphate minerals as well as calcium carbonate.

Example 7

The following Example is illustrative of the invention, and involves contacting PCC3 with a phosphate-comprising anion (provided in the form of an acid), in the presence of excess soluble calcium ions, where soluble calcium ions are generated on contacting the PCC with an acid or an acid salt having a soluble corresponding calcium salt.

In a stainless steel reactor, an aqueous slurry is prepared by adjusting the solids content of the aqueous slurry of PCC3 described hereabove, such that the slurry obtained has a solids content of 10% by dry weight. The temperature of this slurry is thereafter brought to and maintained at a reaction temperature defined in the Table herebelow under "Tslurry".

Under stirring such that an essentially laminar flow is established, an acid or an acid salt having a soluble corresponding calcium salt (Additive1) in an amount corresponding to a given mole equivalents $H_3O^+$ ions per gram PCC on contacting the precipitated calcium carbonate (which corresponds to a generation of a given mole equivalents of solubilised calcium ions, per gram PCC, both of these given values being listed in the Table herebelow), is added to the PCC slurry.

Thereafter, $H_3PO_4$ in an amount corresponding to 30% by weight on PCC and to approximately $3 \times 10^{-3}$ moles $H_3PO_4$ per gram PCC is added to this slurry over a period of 10 minutes. Following this addition, the slurry is stirred for an additional 5 minutes. During this period, the pH of the slurry was observed to decrease temporarily to a value of less than 6.0.

The final solids of the obtained slurry was between 8 and 12% by weight.

The resulting slurry is allowed to sit overnight before filtering and drying the obtained product. The final specific surface area of this dry product is measured and listed in the Table herebelow.

Test 2 of Example 1 is also listed in the Table herebelow as a reference.

TABLE 7

|  | Test | |
| --- | --- | --- |
|  | 3 Prior Art | 3A Invention |
| Tslurry (° C.) | 70 | 70 |
| Additive1 | — | HCl |
| Moles equivalents $H_3O^+$ per gram PCC ($\times 10^{-3}$)** | — | 5.5 |
| Equivalent moles $Ca^{2+}$ ions per gram PCC ($\times 10^{-3}$) | — | 2.7 |
| Equivalent mass $Ca^{2+}$ ions per gram PCC ($\times 10^{-3}$) | — | 108 |
| SSA ($m^2/g$) | 15 | 49 |

**assuming full dissociation of Additive1

In all case, when the product obtained according to the process of the invention was wet ground according to the method provided above, the pH during wet grinding rose by more than 2 and more than a corresponding slurry wherein the surface-reacted PCC was entirely replaced with GCC.

In all case, when the product obtained according to the process of the invention was analysed by TGA as described above, a calcium anion salt:calcium carbonate mass ratio of between 20:80 and 60:40 was observed.

XRD analyses of the products obtained according to the process of the invention indicated the presence of calcium phosphate minerals as well as calcium carbonate.

Example 8

The following Example is illustrative of the invention, and involves contacting PCC2 with a phosphate-comprising anion (provided in the form of an acid), in the presence of excess soluble calcium ions, where soluble calcium ions are generated on contacting the PCC with an acid or an acid salt having a soluble corresponding calcium salt.

In a stainless steel reactor, an aqueous slurry is prepared by adjusting the solids content of the aqueous slurry of PCC2 described hereabove, such that the slurry obtained has a solids content of 10% by dry weight. The temperature of this slurry is thereafter brought to and maintained at a reaction temperature defined in the Table herebelow under "Tslurry".

Under stirring such that an essentially laminar flow is established, an acid or an acid salt having a soluble corresponding calcium salt (Additive1) in an amount corresponding to a given mole equivalents $H_3O^+$ ions per gram PCC on contacting the precipitated calcium carbonate (which corresponds to a generation of a given mole equivalents of solubilised calcium ions, per gram PCC, both of these given values being listed in the Table herebelow), is added to the PCC slurry.

Thereafter, $H_3PO_4$ in an amount corresponding to 30% by weight on PCC and to approximately $3 \times 10^{-3}$ moles $H_3PO_4$ per gram PCC is added to this slurry over a period of 10 minutes. Following this addition, the slurry is stirred for an additional 5 minutes. During this period, the pH of the slurry was observed to decrease temporarily to a value of less than 6.0.

The final solids of the obtained slurry was between 8 and 12% by weight.

The resulting slurry is allowed to sit overnight before filtering and drying the obtained product. The final specific surface area of this dry product is measured and listed in the Table herebelow.

Test 2 of Example 1 is also listed in the Table herebelow as a reference.

TABLE 8

|  | Test | |
| --- | --- | --- |
|  | 2<br>Prior Art | 2C<br>Invention |
| Tslurry (° C.) | 70 | 70 |
| Additive1 | — | HCl |
| Moles equivalents $H_3O^+$ per gram PCC ($\times 10^{-3}$)** | — | 5.5 |
| Equivalent moles $Ca^{2+}$ ions per gram PCC ($\times 10^{-3}$) | — | 2.7 |
| Equivalent mass $Ca^{2+}$ ions per gram PCC ($\times 10^{-3}$) | — | 108 |
| SSA ($m^2/g$) | 18 | 54 |

**assuming full dissociation of Additive1

In all case, when the product obtained according to the process of the invention was wet ground according to the method provided above, the pH during wet grinding rose by more than 2 and more than a corresponding slurry wherein the surface-reacted PCC was entirely replaced with GCC.

In all case, when the product obtained according to the process of the invention was analysed by TGA as described above, a calcium anion salt:calcium carbonate mass ratio of between 20:80 and 60:40 was observed.

XRD analyses of the products obtained according to the process of the invention indicated the presence of calcium phosphate minerals as well as calcium carbonate.

Example 9

The following Example is illustrative of the invention, and involves contacting PCC4 with a phosphate-comprising anion (provided in the form of an acid), in the presence of excess soluble calcium ions, where soluble calcium ions are generated on contacting the PCC with an acid or an acid salt having a soluble corresponding calcium salt.

In a stainless steel reactor, an aqueous slurry is prepared by adjusting the solids content of the aqueous slurry of PCC4 described hereabove, such that the slurry obtained has a solids content of 10% by dry weight. The temperature of this slurry is thereafter brought to and maintained at a reaction temperature defined in the Table herebelow under "Tslurry".

Under stirring such that an essentially laminar flow is established, an acid or an acid salt having a soluble corresponding calcium salt (Additive1) in an amount corresponding to a given mole equivalents $H_3O^+$ ions per gram PCC on contacting the precipitated calcium carbonate (which corresponds to a generation of a given mole equivalents of solubilised calcium ions, per gram PCC, both of these given values being listed in the Table herebelow), is added to the PCC slurry.

Thereafter, $H_3PO_4$ in an amount corresponding to 30% by weight on PCC and to approximately $3 \times 10^{-3}$ moles $H_3PO_4$ per gram PCC is added to this slurry over a period of 10 minutes. Following this addition, the slurry is stirred for an additional 5 minutes. During this period, the pH of the slurry was observed to decrease temporarily to a value of less than 6.0.

The final solids of the obtained slurry was between 8 and 12% by weight.

The resulting slurry is allowed to sit overnight before filtering and drying the obtained product. The final specific surface area of this dry product is measured and listed in the Table herebelow.

Test 2 of Example 1 is also listed in the Table herebelow as a reference.

TABLE 9

|  | Test | |
| --- | --- | --- |
|  | 4<br>Prior Art | 4A<br>Invention |
| Tslurry (° C.) | 70 | 70 |
| Additive1 | — | HCl |
| Moles equivalents $H_3O^+$ per gram PCC ($\times 10^{-3}$)** | — | 5.5 |
| Equivalent moles $Ca^{2+}$ ions per gram PCC ($\times 10^{-3}$) | — | 2.7 |
| Equivalent mass $Ca^{2+}$ ions per gram PCC ($\times 10^{-3}$) | — | 108 |
| SSA ($m^2/g$) | 19 | 87 |

**assuming full dissociation of Additive1

In all case, when the product obtained according to the process of the invention was wet ground according to the method provided above, the pH during wet grinding rose by more than 2 and more than a corresponding slurry wherein the surface-reacted PCC was entirely replaced with GCC.

In all case, when the product obtained according to the process of the invention was analysed by TGA as described above, a calcium anion salt:calcium carbonate mass ratio of between 20:80 and 60:40 was observed.

XRD analyses of the products obtained according to the process of the invention indicated the presence of calcium phosphate minerals as well as calcium carbonate.

Example 10

The following Example is illustrative of the invention, and involves contacting PCC1 with a phosphate-comprising anion (provided in the form of an acid), in the presence of excess soluble calcium ions, where soluble calcium ions are generated on contacting the PCC with an acid or an acid salt having a soluble corresponding calcium salt.

In a stainless steel reactor, an aqueous slurry is prepared by adjusting the solids content of the aqueous slurry of PCC1 described hereabove, such that the slurry obtained features a solids content of 20% by dry weight. The temperature of this slurry is thereafter brought to and maintained at a reaction temperature defined in the Table herebelow under "Tslurry".

Under stirring such that laminar flow is established, an acid or an acid salt having a soluble corresponding calcium salt (Additive1) in an amount corresponding to a given mole equivalents $H_3O^+$ ions per gram PCC on contacting the precipitated calcium carbonate (which corresponds to a generation of a given mole equivalents of solubilised calcium ions, per gram PCC, both of these given values being listed in the Table herebelow), is added to the PCC slurry.

Thereafter, $H_3PO_4$ in an amount corresponding to 30% by weight on PCC weight and to approximately $3\times10^{-3}$ moles $H_3PO_4$ per gram PCC is added to this slurry over a period of 10 minutes. Following this addition, the slurry is stirred for an additional 5 minutes. During this period, the pH of the slurry was observed to decrease temporarily to a value of less than 6.0.

The final solids of the obtained slurry was between 8 and 12% by weight.

The resulting slurry is allowed to sit overnight before filtering and drying the obtained product. The final specific surface area of this dry product is measured and listed in the Table herebelow.

Test 1 of Example 1 is also listed in the Table herebelow as a reference.

TABLE 10

| Test | Invention |
|---|---|
| Tslurry (° C.) | 70 |
| Additive1 | HCl |
| Moles equivalents $H_3O^+$ per gram PCC ($\times10^{-3}$)** | 5.5 |
| Equivalent moles $Ca^{2+}$ ions per gram PCC ($\times10^{-3}$) | 2.7 |
| Equivalent mass $Ca^{2+}$ ions per gram PCC ($\times10^{-3}$) | 108 |
| SSA ($m^2/g$) | 88 |

**assuming full dissociation of Additive1

In all case, when the product obtained according to the process of the invention was wet ground according to the method provided above, the pH during wet grinding rose by more than 2 and more than a corresponding slurry wherein the surface-reacted PCC was entirely replaced with GCC.

In all case, when the product obtained according to the process of the invention was analysed by TGA as described above, a calcium anion salt:calcium carbonate mass ratio of between 20:80 and 60:40 was observed.

XRD analyses of the products obtained according to the process of the invention indicated the presence of calcium phosphate minerals as well as calcium carbonate.

The invention claimed is:

1. A process for the preparation of a pigment comprising a surface-reacted precipitated calcium carbonate (PCC), the process comprising the following steps:
   a) providing at least one precipitated calcium carbonate (PCC)-comprising pigment; and
   b) contacting the PCC-comprising pigment in an aqueous medium with at least one anion that is solubilized in an aqueous medium and forms water-insoluble calcium salts in the presence of excess solubilized calcium ions that are present in the aqueous medium, wherein the anion is in the form of a soluble neutral or acid salt, or is in the form of an acid, wherein the anion is a phosphate-comprising anion, $PO_4^{3-}$, $HPO_4^{2-}$, an oxalate anion ($C_2O_4^{2-}$), a carbonate-comprising anion in the form of $CO_3^{2-}$, a phosphonate anion, a succinate anion or a fluoride anion, wherein the anion is added in a quantity corresponding to between 5 and 50% by weight, based on the weight of said PCC provided in step a), and wherein the PCC-comprising pigment in the aqueous medium, the at least one anion, and excess solubilized calcium ions are mixed so as to develop a laminar flow;
   to form a slurry of surface-reacted PCC comprising an insoluble, at least partially crystalline calcium salt of said anion formed on the surface of at least part of the PCC provided in step a), wherein the excess solubilized calcium ions are provided by the addition to the aqueous medium of:
      (i) $H_3O^+$ ions by addition of an acid or an acid salt that provides all or part of excess solubilized calcium ions in the aqueous medium, wherein the acid or acid salt is a sulphur-comprising acid, sulphuric acid, hydrochloric acid, perchloric acid, formic acid, lactic acid, acetic acid, or nitric acid, or an acid salt thereof, or a soluble calcium acid salt thereof, and/or
      (ii) a soluble neutral calcium salt that provides all or part of excess solubilized calcium ions in the aqueous medium.

2. The process according to claim 1, wherein the PCC-comprising pigment of step a) is hydrophilic.

3. The process according to claim 1, wherein the PCC-comprising pigment of step a) is obtained from a process involving at least one step of comminution.

4. The process according to claim 3, wherein the step of comminution is a wet grinding step.

5. The process according to claim 4, wherein upon wet grinding the PCC-comprising pigment of step a), the pH of the wet grinding slurry is observed to rise by more than 2.

6. The process according to claim 1, wherein the PCC-comprising pigment of step a) has a weight median diameter of 0.01 to 10 µm.

7. The process according to claim 1, wherein the PCC-comprising pigment of step a) has a weight median diameter of 0.5 to 2 µm.

8. The process according to claim 1, wherein the PCC-comprising pigment of step a) further comprises one or more of talc, clay, plastic hollow-sphere pigments or titanium dioxide.

9. The process according to claim 1, wherein the PCC-comprising pigment of step a) consists of PCC.

10. The process according to claim 1, wherein the PCC-comprising pigment of step a) is provided in the form of an aqueous slurry.

11. The process according to claim 10, wherein the slurry has a pH of less than 11 prior to step b).

12. The process according to claim 10, wherein the slurry has a pH of less than 10.5 prior to step b).

13. The process according to claim 10, wherein PCC-comprising pigment is dispersed.

14. The process according to claim 1, wherein the $H_3O^+$ ions provide all or part of said excess solubilized calcium ions by dissolution of the PCC to liberate calcium ions.

15. The process according to claim 1, wherein the acid or acid salt that provides all or part of the excess solubilized calcium ions is sulphuric acid, hydrochloric acid, acetic acid, or nitric acid, or an acid salt thereof, or a soluble calcium acid salt thereof.

16. The process according to claim 1, wherein following the addition of said $H_3O^+$ ions, the pH of the aqueous medium temporarily drops to a value below 6.0.

17. The process according to claim 1, wherein the anion of step b) is a phosphate-comprising anion, $PO_4^{3-}$, or $HPO_4^{2-}$.

18. The process according to claim 1, wherein the anion of step b) is a carbonate-comprising anion that is generated in situ via the introduction of gaseous $CO_2$ to the slurry.

19. The process according to claim 1, wherein the anion in step b) is added in a quantity corresponding to between 15 and 30% by weight, based on the weight of said PCC provided in step a).

20. The process according to claim 1, wherein the anion in step b) is contacted with the PCC after contacting the PCC with the acid or acid salt, or the soluble neutral calcium salt.

21. The process according to claim 1, wherein the excess solubilized calcium ions are provided by addition of sulphuric acid, hydrochloric acid or acetic acid.

22. The process according to claim 1, wherein the excess solubilized calcium ions are provided by addition of a soluble neutral calcium salt selected from the group consisting of $CaCl_2$ and $Ca(NO_3)_2$.

23. The process according to claim 1, wherein the solubilized calcium ions are provided in a quantity corresponding to greater than or equal to 3% by weight, based on the weight of said PCC provided in step a).

24. The process according to claim 1, wherein the solubilized calcium ions are provided in a quantity corresponding to greater than or equal to 5% by weight, based on the weight of said PCC provided in step a).

25. The process according to claim 1, wherein step b) is carried out at a temperature of above 50° C.

26. The process according to claim 1, wherein step b) is carried out at a temperature of above 60° C.

27. The process according to claim 1, wherein step b) takes place in the presence of at least one compound selected from the group consisting of silicate, silica, earth alkali metal aluminate, or mixtures thereof.

28. The process according to claim 27, wherein the silicate is an aluminium silicate or an earth alkali metal silicate.

29. The process according to claim 10, wherein step b) takes place in the presence of an inert gas, which is bubbled through the slurry.

30. The process according to claim 10, wherein step b) takes place in the presence of an additive which increases the ionic strength of the slurry.

31. The process according to claim 30, wherein the additive which increases the ionic strength of the slurry is an inert, non-calcium salt.

32. The process according to claim 31, wherein the inert, non-calcium salt is NaCl or $KNO_3$, or mixtures thereof.

33. The process according to claim 1, wherein the aqueous phase of the surface-reacted PCC slurry formed in step b) is replaced with deionised water.

34. The process according to claims 33, wherein the removed aqueous phase is re-introduced as a source of calcium ions.

35. The process according to claim 1, wherein the process is a continuous process.

36. The process according to claim 1, wherein the slurry of surface-reacted PCC formed in step b) is concentrated.

37. The process according to claim 1, wherein a dispersant is added to the slurry of surface-reacted PCC formed in step b).

38. The process according to claim 1, wherein the slurry of surface-reacted PCC formed in step b) is dried to obtain a dry surface-reacted PCC product.

39. The process according to claim 38, wherein the dry product is treated with one or more fatty acids.

40. The process according to claim 38, wherein the dry product is washed with water.

41. The process according to claim 1, wherein $H_3O^+$ ions are provided by addition of hydrochloric acid, and the anion of step b) is a phosphate-comprising anion provided by addition of $H_3PO_4$.

42. The process according to claim 1, wherein $H_3O^+$ ions are provided by addition of acetic acid, and the anion of step b) is a phosphate-comprising anion provided by addition of $H_3PO_4$.

43. The process according to claim 1, wherein the $H_3O^+$ ions are provided by addition of sulphuric acid, and the anion of step b) is a phosphate-comprising anion provided by addition of $H_3PO_4$.

44. The process according to claim 1, wherein the solubilized calcium ions are provided by addition of $CaCl_2$, and the anion of step b) is a phosphate-comprising anion provided by addition of $H_3PO_4$.

45. The process according to claim 1, wherein the solubilized calcium ions are provided by addition of $Ca(NO_3)_2$, and the anion of step b) is a phosphate-comprising anion provided by addition of $H_3PO_4$.

46. The process according to claim 1, wherein $H_3O^+$ ions are provided by addition of hydrochloric acid, and the anion of step b) is a phosphate-comprising anion provided by addition of $Na_3PO_4$ or $Na_4HPO_4$.

47. The process according to claim 1, wherein $H_3O^+$ ions are provided by addition of hydrochloric acid, the anion of step b) is a phosphate-comprising anion provided by addition of $H_3PO_4$, and step b) takes place in the presence of NaCl.

48. The process according to claim 1, wherein $H_3O^+$ ions are provided by addition of hydrochloric acid, the anion of step b) is a phosphate-comprising anion provided by addition of $H_3PO_4$, and step b) takes place in the presence of $KNO_3$.

49. The process according to claim 1, wherein the surface-reacted PCC so obtained in step b) has a calcium anion salt : calcium carbonate mass ratio of 20:80 to 60:40 as determined by thermogravimetric analysis.

50. The process according to claim 1, wherein the $H_3O^+$ ions and/or the soluble neutral calcium salt are added before the at least one anion capable of forming water-insoluble calcium salts.

* * * * *